April 22, 1930. R. R. BLOSS ET AL 1,755,723
SELF ALIGNING PITMAN BEARING
Filed June 7, 1929   2 Sheets-Sheet 1

INVENTORS
Richard R. Bloss.
Roy C. Pfeil.
BY
ATTORNEY

April 22, 1930.  R. R. BLOSS ET AL  1,755,723
SELF ALIGNING PITMAN BEARING
Filed June 7, 1929    2 Sheets-Sheet 2

INVENTORS
Richard R. Bloss.
Roy G. Pfeil.
BY
Edwin P. Forbes
ATTORNEY

Patented Apr. 22, 1930

1,755,723

UNITED STATES PATENT OFFICE

RICHARD R. BLOSS AND ROY C. PFEIL, OF COLUMBUS, OHIO, ASSIGNORS TO THE INTERNATIONAL DERRICK & EQUIPMENT COMPANY, OF COLUMBUS, OHIO, A CORPORATION OF OHIO

SELF-ALIGNING PITMAN BEARING

Application filed June 7, 1929. Serial No. 369,202.

Our invention relates to a self-aligning pitman bearing and is particularly adapted for use in connection with drilling and pumping mechanism for oil, gas or artesian wells. It is designed to meet a condition which frequently arises in mechanism of this type owing to the more or less rough conditions of erection and operation which frequently bring about the misalignment of the working parts and tend to throw an undue strain upon certain of these parts.

Our invention relates particularly to a bearing structure which is formed in two parts, that is, a base section and a cap section, with these sections held together by means of a wedge bearing upon the cap section. In the past, some effort has been directed to the provision of a bearing of this structure which will compensate for misalignment by pivoting the bearing at its base and maintaining a sliding contact between the top of the cap section of the bearing and the wedge which is designed to force this cap section downwardly. The difficulty about this is that, if the wedge is caused to exert sufficient pressure to maintain the cap section in proper position to ensure satisfactory gripping of the wrist pin, the pressure exerted by this wedge must inevitably preclude such free sliding of the cap section with relation to the wedge as is necessary to properly compensate for misalignment. Conversely, if the wedge is forced in only to such extent as will permit free sliding of the cap section with relation thereto as the bearing swings about its pivot to compensate for misalignment, the bearing sections will not be held together with sufficient firmness to avoid lost motion and consequent hammering of the wrist pin against the bearing surfaces of the bearing section. Even under the best conditions, the operation of drilling or pumping is more or less "jerky" and the hammering action is harmful enough without accentuating this by permitting the bearing sections to loosely grip the wrist pin.

We have provided a self-aligning bearing for a pitman wherein the compensatory action of the bearing mainly takes place within itself. In a bearing wherein the cap section is held in position upon the base section by means of a wedge, we utilize a cap section which does not have a sliding contact with the wedge but which has a rolling contact about the top part of the wedge. This will permit the cap section and wedge to move to affect compensation for misalignment without the necessity for diminishing such downward pressure upon the cap section as will hold it firmly against the base section and the wrist pin. In addition, our cap section is so mounted that it is free to slide laterally along the wrist pin as this wrist pin changes its position due to misalignment.

In conjunction with the cap section, we provide a base section for my bearing which is slidably supported from beneath by means of an arcuate path of such a curvature that the bearing surface of the bearing will remain in firm contact with the wrist pin as this wrist pin assumes various positions due to misalignment. We preferably accomplish this by mounting the lower section of the bearing slidably upon an arcuate track whose curvature is taken about a center within that portion of the wrst pin normally contained within the bearing.

Stated another way, in specific application to a bearing whose sections are held together by a wedge, our bearing structure comprises a base section which is free to automatically move with the wrist pin as it tilts into or out of horizontal position, this automatic movement taking place upon an arcuate track whose center of curvature is within the wrist pin. It also comprises a cap section which is firmly held against the wrist pin by a wedge exerting pressure thereon through a rolling contact which will permit the cap section to slide longitudinally with relation to the wrist pin while remaining in intimate and effective contact therewith, the pitman and bearing structure being such as to permit this relatively sliding action. Thus, it will be seen that we have provided a bearing structure in which the bearing sections are movable independently with relation to each other to compensate for misalignment while, in addition, one of these sections is slidable with relation to the wrist pin so that adequate compensation may be affected while maintaining adequate pressure to hold the bearing sections in proper position, as by means of the rolling contact described.

The preferred embodiment of our invention is shown in the accompanying drawings wherein similar characters of reference designate corresponding parts and wherein.

Figure 1:
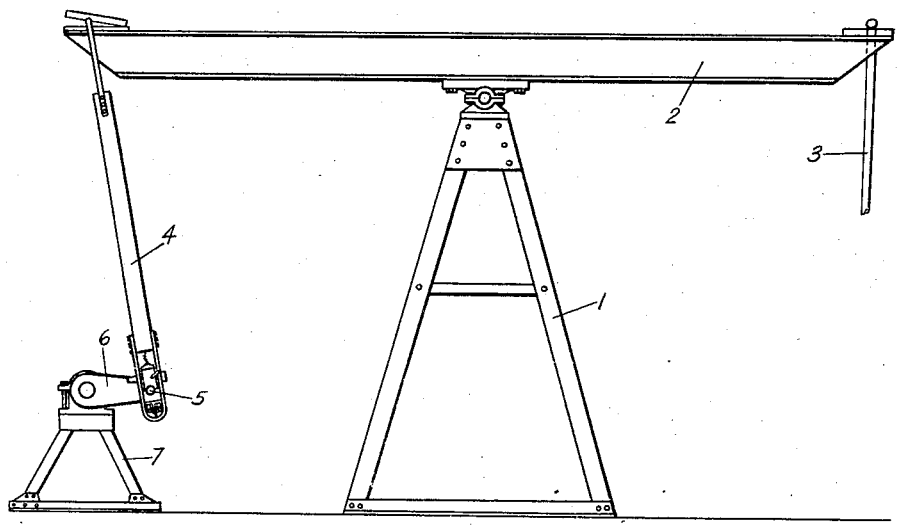
Figure 1 is a front elevation of a drilling rig structure with our invention applied thereto.
Figures 2, 3:
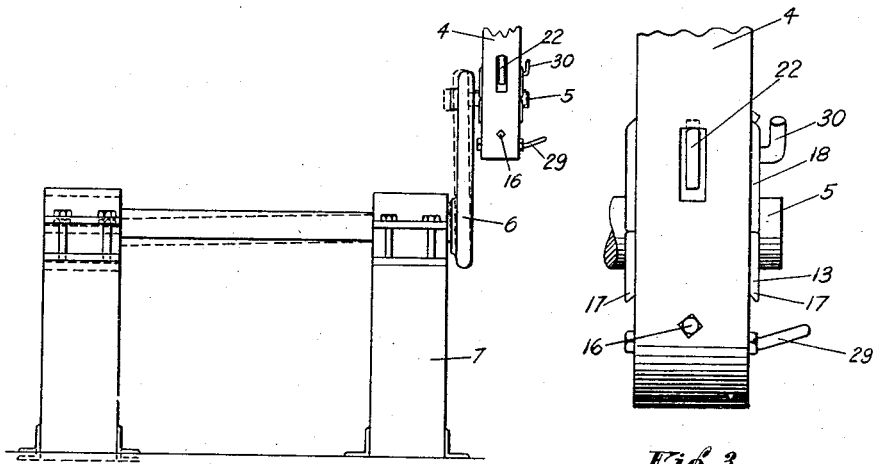
Figure 2 is an end elevation of this structure with a dotted line illustration of the misalignment which frequently occurs due to the fact that the crank shaft is out of horizontal position or that the crank arm or wrist pin are tilted out of their normal position.
Figure 3 is a side elevation of the lower end of a pitman structure with our self-aligning bearing mounted therein.
Figure 4:
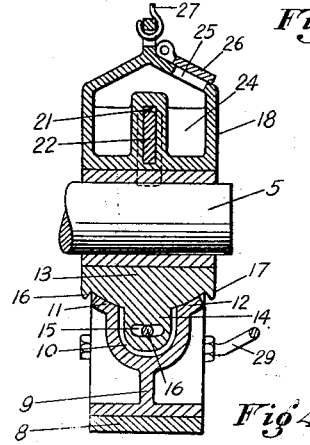
Figure 4 is a vertical section of the structure shown in Figure 3.
Figure 5:
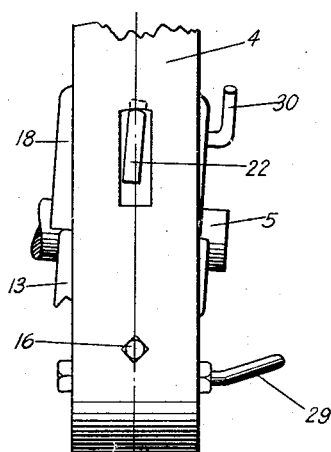
Figure 5 is a side elevation of the lower end of a pitman having our self-aligning bearing forming a part thereof and illustrating the position assumed by the bearing sections when one end of the wrist pin is tilted upwardly from a horizontal position.

Referring particularly to Figures 1 and 2 of the drawings, it will be seen that the drilling rig structure shown embodies a Samson post 1, a walking beam 2 and a temper screw 3 and pivotally mounted upon the opposite end of the walking beam is a pitman 4. This pitman 4 is connected at its lower end to the wrist pin 5 of a crank arm 6 carried upon a jack-post 7.

Referring particularly to Figure 2 of the drawings, the dotted line illustration of the wrist pin shows a condition which frequently arises either during the erection or continued operation of a structure of this type. In this condition, the wrist pin which should properly have its axis disposed in a horizontal plane is tilted in one direction or the other so that its axis extends upwardly or downwardly from the horizontal. It is obvious that, in the event that the bearing structure which carries the wrist pin is rigidly connected to the pitman, a severe strain will be thrown upon the pitman. Efforts have been previously made to automatically compensate for this condition of misalignment but these efforts have been more or less ineffectual.

We have provided a self-aligning bearing structure which automatically compensates for this condition of misalignment. In our bearing structure, the bearing is preferably mounted within the base of a U-shaped lower end of a pitman 8. The bearing structure, itself, preferably comprises a substantially T-shaped member 9 having a central concavity 10 and spaced portions 11 and 12 of a track.

This track formed by the members 11 and 12 is adapted to slidably support the arcuate lower surface 13 of the base section of our bearing. This base section is likewise provided with a downwardly extending portion 14 which extends into the central concavity 10 of the member 9 and is capable of a lateral movement therein. This downwardly extending portion 14 is slotted as at 15 for the reception of a transverse pin 16 that extends through the side walls of the U-shaped member of the pitman and assists in limiting the sliding action of the base section 13 upon the track 11 and 12. The sliding action of this base section 13 upon the track 11 and 12 is also limited by means of downwardly extending flanges 17 carried upon the base section 13. The upper surface of the base section 13 carries a semi-cylindrical concavity of proper bearing metal for supporting and embracing the under side of the wrist pin 5.

The cap section of our bearing structure may vary as to form but it preferably comprises a body portion 18 with a concave under surface 19 and a concave bearing section 20 which is adapted to rest upon and closely fit the upper portion of the wrist pin 5. This body portion 19 is desirably provided with a slot 21 extending transverse thereof and having its bottom wall inclined from the horizontal with its upper wall substantially horizontal. A wedge 22 is adapted to be forced through slots in the side walls of the pitman structure and through the slot 21 in such a way as to force the bearing cap downwardly upon the wrist pin.

Figure 6:
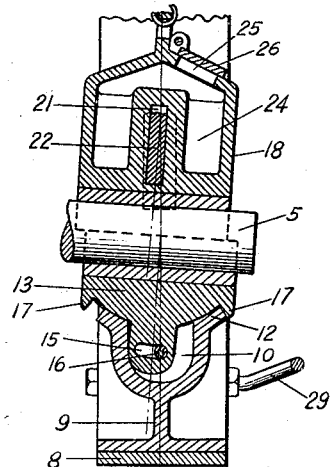
Figure 6 is a sectional view of the structure shown in Figure 5 and illustrating the bearing sections in the positions which they assume under the conditions illustrated by Figure 5.
Figure 7:
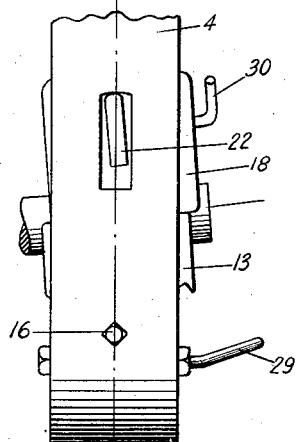
Figure 7 is a side elevation of the lower end of the pitman structure having our self-aligning bearing forming a part thereof and illustrating the position assumed by the bearing sections when the opposite end of the wrist pin is tilted upwardly from a horizontal position.
Figure 8:
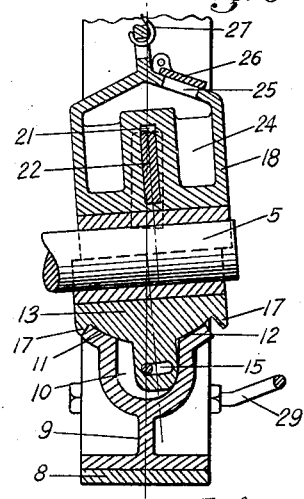
Figure 8 is a sectional view of the structure shown in Figure 7 and illustrating the bearing sections in the positions which they assume under the conditions illustrated by Figure 7.
Figure 9:
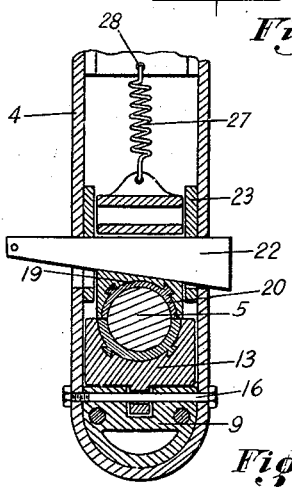
Figure 9 is a section taken at right angles to the sections shown in Figures 4, 6 and 8.

It will be noted by reference to Figures 1, 3 and 6 of the drawings that the side walls of this wedge member are substantially spaced from the side walls of the slots which are formed in the walls of the pitman. Furthermore, the upper edge of the wedge member 22 is rounded and is designed to bear upon the rounded upper walls of these slots in the side walls of the pitman with a rolling contact. The structure is such that the wedge member 22 has a limited bearing upon the upper walls of these slots in the pitman structure, so that this wedge member may swing laterally about its points of contact with these upper walls of such slots without materially diminishing the downward pressure which is being exerted by the wedge upon the cap section. In operation, as will be subsequently described, the cap section is also designed to swing with this wedge member about its points of contact upon the upper walls of the slots in the pitman structure. It might be noted at this point that the walls of the slots formed in the legs of the U-shaped member of the pitman structure are preferably reenforced by members 23 having aligning slots formed therein.

If desired, the cap sections may be provided with a lubricant well 24 having an opening 25 and a flap cover 26 therefor. It may also be connected to a retractile spring 27 connected at its upper end to the pitman as at 28. Likewise, the pitman may be provided with a handle 29 and with a set screw 30 mounted in the cap section in such a manner as to permit of locking the wedge member at any desired point therein.

In operation, and referring particularly to Figures 3 to 8, inclusive, it will be seen that the tilting of the wrist pin away from its normal horizontal position will result in the simultaneous tilting of the lower base section. Furthermore, it will be apparent that this simultaneous tilting of the base section will be effected without any separation between the lower surface of the wrist pin and the bearing surface of the lower section, owing to the fact that the lower end of the base section slides upon its arcuate track and swings about a point within the wrist pin.

Furthermore, in this operation, the cap section of the bearing will swing independently of the base section, this swinging action being effected by rolling upon the upper surface of the wedge and being accompanied by a sliding action longitudinally of the wrist pin. Due to this combined swinging and sliding action, the bearing surface of the cap section will remain in intimate contact with the upper surface of the wrist pin throughout the tilting of the wrist pin.

The combined effect of these relatively independent movements of the base and cap sections is to cause the bearing surfaces of these two sections to hug the wrist pin throughout the tilting thereof and to accomplish this without any strain being applied to the pitman, owing to the fact that both the base section and the cap section maintain pressure contact with the pitman without being actually connected therewith.

Having thus described our invention, what we claim is:

1. A self-aligning bearing structure for a pitman comprising a base mounted to swing with the wrist pin as it tilts, and a cap mounted to slide upon said wrist pin as said wrist pin tilts.

2. A self-aligning bearing structure for a pitman comprising in combination with a wrist pin, a base mounted to tilt with said wrist pin as said wrist pin tilts, and a cap adapted to slide upon said wrist pin as said wrist pin tilts.

3. A self-aligning bearing structure for a pitman comprising, in combination with a wrist pin, a base mounted to tilt with said wrist pin about a point within said wrist pin as said wrist pin tilts, and a cap mounted to tilt upon said pitman and slide with relation to said wrist pin as said wrist pin tilts.

4. A self-aligning bearing structure for a pitman comprising a base section and a cap section, said sections being mounted to slide along the wrist pin in opposite directions upon the tilting of a wrist pin contained therein.

5. A self-aligning bearing structure for a pitman comprising a base section and a cap section, one of said sections being slidable along a wrist pin to compensate for misalignment.

6. A self-aligning bearing structure for a pitman comprising a base section and a cap section, said base section being adapted to swing with a wrist pin as it tilts into or out of horizontal position and an upper section mounted to slide relative to the wrist pin during such tilting action.

7. A self-aligning bearing structure comprising a base section, a cap section, a wedge member for forcing said sections into intimate contact with a wrist pin, said wedge member being carried by one of said sections and having a rolling support upon said pitman.

In testimony whereof we hereby affix our signatures.

RICHARD R. BLOSS.
ROY C. PFEIL.